United States Patent

Billings

[15] 3,658,463

[45] Apr. 25, 1972

[54] SOLVENT ABSORPTION OF CARBON MONOXIDE

[72] Inventor: William G. Billings, Bartlesville, Okla.

[73] Assignee: Phillips Petroleum Company

[22] Filed: Oct. 6, 1969

[21] Appl. No.: 864,208

[52] U.S. Cl. .............................. 23/2 R, 23/203 C, 23/204 M
[51] Int. Cl. ............................... B01d 53/34, B01d 53/16
[58] Field of Search .............. 23/2, 2.3, 3, 3.3, 203 C, 204 M; 55/68

[56] References Cited

UNITED STATES PATENTS

| | | |
|---|---|---|
| 1,999,159 | 4/1935 | Peski ........................................ 23/2 X |
| 2,519,284 | 8/1950 | Ray et al. .................................. 23/2 X |
| 2,970,177 | 1/1961 | Cobb, Jr. .................................. 23/3 X |
| 3,026,172 | 3/1962 | Hirschbeck et al. ..................... 23/2 |
| 3,102,919 | 9/1963 | Hirschbeck et al. ..................... 23/3 X |
| 3,317,275 | 5/1967 | Tate et al. ................................ 23/2 |
| 3,410,924 | 11/1968 | Fasce ..................................... 23/204 M |
| 3,415,615 | 12/1968 | Blytas et al. ............................ 23/2 X |

Primary Examiner—Earl C. Thomas
Attorney—Young and Quigg

[57] ABSTRACT

A process for the selective removal of carbon monoxide from gaseous streams employing an absorbent comprising cuprous chloride in an organic medium such as formamide, an ether, an amine, a nitrile, a nitroparaffin, a nitroaromatic, pyridine, olefins and methyl cellosolve and combinations thereof.

11 Claims, No Drawings

SOLVENT ABSORPTION OF CARBON MONOXIDE

This invention relates to solvent absorption.

In one of its more specific aspects, this invention relates to the selective removal of carbon monoxide from a gaseous stream in which it is contained.

Various processes have been developed for the selective absorption of carbon monoxide from gaseous streams. One such process employs a cuprous chloride and magnesium chloride combination in aqueous solution. Another process employs a cuprous complex salt in an organic solvent. These, and other processes, however, all contain certain limitations in respect to absorbent characteristics, absorption conditions, or absorbent regeneration capabilities which act to limit their application. The method of the present invention provides a carbon monoxide absorption process which minimizes such limitations.

According to the method of this invention, carbon monoxide is selectively removed from a gas stream in which it is contained by contacting the gaseous stream with an absorbent comprising a cuprous salt and an organic liquid and absorbing a portion of the carbon monoxide from the gaseous stream into the absorbent.

The method of this invention contemplates contacting the gaseous stream containing the carbon monoxide with an organic liquid containing a cuprous salt, such as cuprous chloride, to selectively absorb carbon monoxide from the gas stream, with the subsequent treatment of the absorbate to separate the carbon monoxide therefrom and to recover the absorbent which can be recycled to the contacting step.

The cuprous salt which is employed in the absorbent is preferably cuprous chloride. Its concentration in the admixture of various organic mediums with which it forms the absorbent, which is probably a cuprous complex, can be varied over wide ranges for each organic medium and for each combination of organic mediums.

Among the preferred organic mediums, which can be employed individually or in combination, are formamide, ethers such as ethylene glycol monoethyl ether, amines, pyridine, a nitrile, a nitro paraffin, a nitro aromatic, and olefins.

When the absorbent comprises the combination of cuprous chloride, formamide and an ether such as ethylene glycol monomethyl ether, the admixture will have a composition of about 40 to about 60 parts of formamide to about 60 to about 40 parts of the ethylene compound. Preferably, the mixture will have a preferred composition of equal parts for formamide and the ethylene compound. Upon absorption of carbon monoxide, there is formed a solid, separable by filtration in a nitrogen atmosphere, which solid evolves carbon monoxide upon standing.

When the absorbent comprises the combination of cuprous chloride, formamide and monoethanol amine, it will preferably be comprised of about 1 mole cuprous chloride in the liter of solution comprising about 70 to about 80 volume percent formamide and about 30 to about 20 volume percent mononethanol amine.

When the absorbent comprises the combination of cuprous chloride, formamide and pyridine, it will preferably be comprised of about 1 to about 1.5 moles of cuprous chloride in 1 liter of solvent comprising from about 77 to about 83 volume percent formamide and about 23 to 17 volume percent pyridine. The resultant absorbate is free of solids.

When the absorbent comprises the combination of cuprous chloride and an olefin, the solution is preferably comprised of about 1 part by weight of cuprous chloride in a solution comprising about 5 to about 20 parts by volume of the olefin. Suitable olefins are 4-vinyl-cyclohexene-1 and 1-hexene.

When the absorbent comprises the combination of cuprous chloride, methyl cellosolve and formamide, it will be preferably comprised of about 1 to about 15 moles of cuprous chloride in a mixture containing about 50 volume percent formamide and about 50 volume percent methyl cellosolve.

When the absorbent comprises the combination of cuprous chloride, formamide and methyl cellosolve, i.e., 2-methoxyethanol, and pyridine, it will contain about 1 mole of cuprous chloride per liter of solvent comprising about 40 volume percent formamide, 40 volume percent methyl cellosolve, and about 20 volume percent pyridine. The resulting absorbate is free of solids.

In a preferred embodiment in which the absorbent comprising the combination of cuprous chloride, formamide and 2-methoxyethanol as a slurry system the cuprous chloride is present in about 1 to about 50 parts by weight in about equal volumes of about 100 parts by weight of 2-methoxyethanol and formamide.

In the preferred embodiment of this invention, in terms of which it will be explained without meaning to limit the invention thereto, the absorbent will be one in which propionitrile and formamide are combined in a mixture in ratios from about 10 to about 50 volumes of propionitrile in about 90 to about 50 volumes of formamide, the cuprous chloride being incorporated in the mixture from about 1.6 to about 6.5 molar. The solution is preferably prepared by mixing the two organic liquids and incorporating the cuprous chloride therein to the desired concentration to form a solid-free solution.

The contact between the absorbent and the carbon monoxide containing gas can be made in any conventional manner, being preferably made countercurrently at about atmospheric temperature and pressure in a contacting or absorption zone, the carbon monoxide free gas being withdrawn overhead from the zone and the carbon monoxide rich solution being withdrawn from the bottom of the zone and introduced into a regeneration zone. Regeneration of the absorbent can be conducted at about atmospheric pressure and at a temperature of about 130° F. A conventional reboiler can be employed for adding heat to the regeneration zone, with the regenerated absorbent being withdrawn from the regenerator and introduced into the contacting zone, the carbon monoxide stream being removed overhead from the regeneration zone.

Comparative data for two of the systems contemplated by the present invention are shown below and these systems are compared with a system which employs cuprous chloride in combination with propionitrile to the exclusion of the formamide. These data are as shown on Table I.

The previous data indicate that equilibrium values for the solutions employed in the method of this invention are superi-

TABLE I

Comparison of rates of absorption and desorption and equilibrium values for propionitrile solvent systems

| Adsorbate solvent ratio | Concentration of CuCl (moles/liter) | Rate of absorption, (sec.$^{-1}$ × K, 10$^{-3}$) at— | | Rate of desorption, (sec.$^{-1}$ × K, 10$^{-3}$) at— | | Equilibrium constant where $K_{eq} = \dfrac{[Cu:CO]}{[Cu][CO \text{ p.p. atm.}]}$ | | | | |
|---|---|---|---|---|---|---|---|---|---|---|
| | | 90° F. | 120° F. | 85° F. | 130° F. | 0° F. | 80° F. | 90° F. | 100° F. | 110° F. |
| 10 vol percent propionitrile<br>90 vol. percent formamide | 1 | 10.0 | 2.7 | 2.0 | 5.6 | 1.16 | 1.11 | 0.185 | 0.58 | 0.43 |
| 50 vol. percent propionitrile<br>50 vol. percent formamide | 1 | 18.0 | 15.0 | 1.23 | 9.2 | 0.42 | 0.33 | 0.123 | 0.17 | 0.13 |
| 100% propionitrile | 1 | 34.0 | 25.0 | 2.2 | 19 | 0.17 | 0.13 | 0.101 | 0.076 | 0.062 | or to equilibrium values for the cuprous propionitrile systems at about comparable absorption and desorption rates.

The following tables indicate the degree of cuprous-carbonyl formation for various solutions of this invention when employing a 0.5 molar cuprous chloride solution in the mixture designated at a carbon monoxide pressure of 28 psig at 78° F.

TABLE II

Mixtures of Formamide and Ethanolamine

| Solvent Composition, Volume % | | % Copper |
|---|---|---|
| Ethanolamine | Formamide | Complexed |
| 100 | 0 | 91.0 |
| 90 | 10 | 94.2 |
| 70 | 30 | 91.2 |
| 60 | 40 | 94.1 |
| 40 | 60 | 92.2 |
| 30 | 70 | 94.1 |
| 27.5 | 72.5 | 92.6 |
| 26.0 | 74.0 | 97.0 |
| 25.0 | 75.0 | 99.5 |
| 24.0 | 76.0 | 97.0 |
| 0 | 100 | 82.9 |

TABLE III

Mixtures of Formamide and 2-Methoxyethanol

| Solvent Composition, Volume % | | % Copper |
|---|---|---|
| 2-Methoxyethanol | Formamide | Complexed |
| 100 | 0 | 77.5 |
| 80 | 20 | 68.3 |
| 60 | 40 | 86.5 |
| 55 | 45 | 92.2 |
| 50 | 50 | 100.0 |
| 40 | 60 | 83.5 |
| 20 | 80 | 82.4 |
| 10 | 90 | 88.7 |
| 0 | 100 | 82.9 |

TABLE IV

Mixtures of Formamide and Propionitrile

| Solvent Composition, Volume % | | % Copper |
|---|---|---|
| Propionitrile | Formamide | Complexed |
| 100 | 0 | 21.7 |
| 80 | 20 | 34.5 |
| 70 | 30 | 36.8 |
| 60 | 40 | 34.9 |
| 50 | 50 | 40.8 |
| 40 | 60 | 47.3 |
| 30 | 70 | 48.7 |
| 20 | 80 | 51.2 |
| 10 | 90 | 70.0 |
| 0 | 100 | 82.9 |

Inasmuch as the solutions employed in this invention form sulfides of copper within the system when contacted with hydrogen sulfide and carbonyl sulfide, and such forms are substantially irreversible, it is desirable that the gaseous stream from which the carbon monoxide is to be separated be desulfurized prior to contact with the copper salt containing absorbent.

As a means of facilitating the regeneration of the absorbent when comprised of CuCl in methylcellosolve, formamide, and pyridine, certain organic mediums such as methylethylketone, methylisobutylketone and acetone can be added to the absorbate prior to regeneration. In the case of acetone, for example, such addition is preferably made by adding to the absorbate sufficient acetone such that its concentration of the resulting solution is from about 20 to about 50 percent by volume. Regeneration is then easily accomplished at atmospheric pressure and a temperature of about 130° to about 180° F., the acetone being taken overhead with the carbon monoxide, separated from the carbon monoxide in an accumulator, and recycled for introduction to the absorbate being introduced into the regenerator. While it is preferable that all of the acetone be removed from the absorbent which is recycled, small amounts of acetone in the recycled regenerated solution will not prevent absorption.

While atmospheric regeneration of the absorbates is practical, regeneration can be carried out at a pressure reduced to about 7 psia at about 165° F.

Hydrogen can also be employed in the regeneration of solutions comprising cuprous chloride in propionitrile and formamide which contain water. The regeneration is accomplished by contacting the water-containing absorbate in any suitable manner with a gaseous stream containing hydrogen at about 40 psig and about 110° F. for a sufficient period of time to substantially restore the equilibrium constant of the solution to substantially that value possessed by the solution prior to use.

The data in the following table illustrates hydrogen regeneration. The original absorbate comprised a 1.2 molar cuprous chloride solution in an admixture of 10 volume percent propionitrile and 90 volume percent formamide.

The initial solution exhibited various equilibrium constants at various temperatures as did the original solution when containing 10 percent water. Data are also shown for the regenerated solution, regenerated by contact with hydrogen under the previously described conditions for a period of about 24 hours.

TABLE V

Equilibrium Values for Solution

| Temperature, °K. | Initial | Containing 10% Water | After 24 Hr. Hydrogen Regeneration |
|---|---|---|---|
| 286 | 1.27 | 0.17 | 1.27 |
| 294 | 1.16 | 0.14 | 1.16 |
| 303 | 0.93 | 0.12 | 0.84 |
| 313 | 0.55 | 0.10 | 0.48 |
| 322 | 0.32 | 0.05 | 0.27 |

The above data indicate that the solution can be restored to substantially the same absorption capacity as it possessed in its original state.

It will be evident from the foregoing that various modifications can be made to the method of this invention. However, such are considered as being within the scope of the invention.

What is claimed is:

1. A method of selectively removing carbon monoxide from a gas stream which comprises contacting said gas stream with an absorbent containing as essential ingredients a cuprous salt, formamide and a material selected from the group consisting of ethers, amines, pyridine, nitriles, nitroparaffins, nitroaromatics and olefins to absorb at least a portion of said carbon monoxide from said gaseous stream into said absorbent to form a carbon monoxide containing absorbent.

2. The method of claim 1 in which said absorbent contains as its essential ingredients cuprous chloride, formamide and at least one of ethylene glycol monomethyl ether, monoethanol amine, pyridine, 4-vinyl-cyclohexene-1, 1-hexene, methylcellosolve, 2-methoxyethanol and propionitrile.

3. The method of claim 2 in which said absorbent contains as its essential ingredients cuprous chloride, formamide and ethylene glycol monomethyl ether, said formamide and said ethylene glycol monomethyl ether being contained in amounts of about 40 to about 60 parts of formamide to about 60 to about 40 parts of ethylene glycol monomethyl ether.

4. The method of claim 2 in which said absorbent contains as its essential ingredients cuprous chloride, formamide and monoethanol amine, said formamide and said monoethanol amine being contained in amounts of about 70 to about 80 volume percent of formamide to about 30 to about 20 volume percent of monoethanol amine.

5. The method of claim 2 in which said absorbent contains as its essential ingredients cuprous chloride, formamide and pyridine, said formamide and said pyridine being contained in amounts of about 77 to about 83 volume percent formamide and about 23 to about 17 volume percent pyridine.

6. The method of claim 2 in which said absorbent contains as its essential ingredients cuprous chloride, formamide and methylcellosolve, said formamide and methylcellosolve being contained in substantially equal quantities.

7. The method of claim 2 in which said absorbent contains as its essential ingredients cuprous chloride, formamide, methylcellosolve and pyridine, said formamide, methylcellosolve and pyridine being contained in amounts of about 40 volume percent formamide, 40 volume percent methylcellosolve and 20 volume percent pyridine.

8. The method of claim 2 in which said absorbent contains as its essential ingredients cuprous chloride, formamide and 2-methoxyethanol, said formamide and said 2-methoxyethanol being contained in substantially equal quantities.

9. The method of claim 2 in which said absorbent contains as its essential ingredients cuprous chloride, formamide and propionitrile, said formamide and said propionitrile being contained in amounts of about 90 to about 50 volumes of formamide and about 10 to about 50 volumes of propionitrile.

10. The method of claim 7 in which said carbon monoxide containing absorbent is regenerated and at least one of methylethylketone, methylisobutylketone and acetone is introduced into said absorbent prior to regeneration.

11. The method of claim 9 in which said carbon monoxide containing absorbent contains water and said absorbent is regenerated by contacting said absorbent with a gaseous stream containing hydrogen.

* * * * *